United States Patent
Hodac

(10) Patent No.: US 6,634,254 B1
(45) Date of Patent: Oct. 21, 2003

(54) DEVICE FOR FIXING A HUB ON A SHAFT, ESPECIALLY A STEERING WHEEL HUB ON A STEERING COLUMN

(75) Inventor: Hung Hodac, Niedernberg (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 09/674,874

(22) PCT Filed: May 5, 1999

(86) PCT No.: PCT/DE99/01407

§ 371 (c)(1),
(2), (4) Date: Jan. 3, 2001

(87) PCT Pub. No.: WO99/56998

PCT Pub. Date: Nov. 11, 1999

(30) Foreign Application Priority Data

May 5, 1998 (DE) .................................... 298 08 420 U

(51) Int. Cl.⁷ .............................. G05G 1/10; F16D 1/00
(52) U.S. Cl. .............................. 74/552; 403/330; 403/1
(58) Field of Search .............................. 74/552; 403/1, 403/330

(56) References Cited

U.S. PATENT DOCUMENTS

| 3,240,519 | A |   | 3/1966  | Weasler    | 287/119  |
|-----------|---|---|---------|------------|----------|
| 3,923,409 | A | * | 12/1975 | Stoner     | 403/290  |
| 5,580,184 | A | * | 12/1996 | Riccitelli | 403/365  |
| 5,588,337 | A | * | 12/1996 | Milton     | 74/552   |
| 5,615,910 | A | * | 4/1997  | Margetak et al. | 280/731 |
| 5,741,025 | A | * | 4/1998  | Meyer et al. | 280/731 |
| 5,975,561 | A | * | 11/1999 | Harvey et al. | 280/728.2 |
| 6,041,677 | A |   | 3/2000  | Reh et al. | 74/552   |

FOREIGN PATENT DOCUMENTS

| DE | 1 079.923       | 4/1960  |
| DE | 37 10 173 C2    | 2/1990  |
| DE | 295 16 622      | 3/1996  |
| DE | 44 39 576 A1    | 5/1996  |
| DE | 196 16 234      | 10/1997 |
| DE | 298 08 420      | 9/1998  |
| DE | 299 02 033 U1   | 5/1999  |
| EP | 0 088 589       | 9/1983  |
| EP | 0 339 380       | 11/1989 |
| EP | 0 706 929       | 4/1996  |
| JP | 58-166129       | 10/1983 |
| JP | 8-244628        | 9/1996  |
| JP | 10-167081       | 6/1998  |

* cited by examiner

Primary Examiner—David A. Bucci
Assistant Examiner—Justin Stefanon
(74) Attorney, Agent, or Firm—Foley & Lardner

(57) ABSTRACT

A device for fixing a hub on a shaft, especially for fixing a steering wheel hub on a steering column, using a fastening screw. The screw extends crosswise to the shaft, is guided in the hub and has a cone-shaped section for engaging in a channel or groove is the shaft. When the hub is laid axially on a stop of the shaft, the axis of the screw is situated higher up than the center of the channel or groove of the shaft while the hub rests on the shaft above and below the channel or groove, with a positive fit.

12 Claims, 3 Drawing Sheets

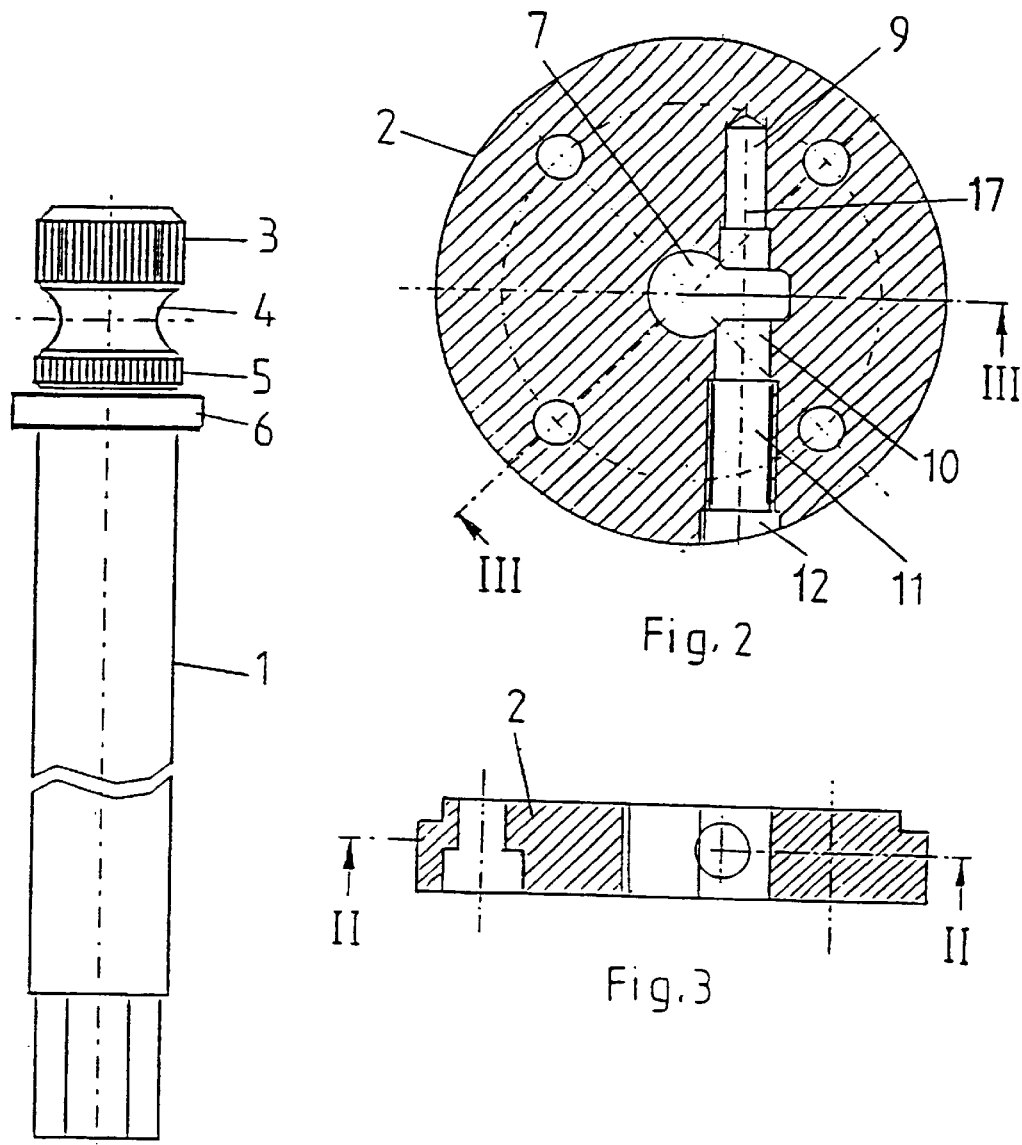

DEVICE FOR FIXING A HUB ON A SHAFT, ESPECIALLY A STEERING WHEEL HUB ON A STEERING COLUMN

BACKGROUND OF THE INVENTION

The invention relates to a device for fastening a steering wheel hub on a steering column.

DE 196 16 234 A1 discloses a device for fastening a hub on a shaft, in particular a steering wheel hub on a steering column, by means of a screw engaging transversely in the shaft. The screw is guided in the hub and engages partially in the shaft or the steering column by means of a conical section. The shaft is provided with a serration which is assigned a corresponding toothing in the hub.

In the case of this type of connection, precise manufacturing of the individual connecting parts is required so as to fasten the hub on the shaft in a manner free of play.

EP 0 706 929 A1 discloses a device for fastening a hub on a steering column using a fastening screw running transversely to the steering column, the fastening screw being guided in the hub and having a conical section for the central engagement in a groove in the steering column. In addition, the hub bears against the shaft above and below the groove.

EP 0 088 589 A1 and EP 0 339 380 A1 each disclose a device for the coaxial, rotationally fixed connection of two parts which can be rotated together, a threaded pin which is fastened to a first of the two parts engaging by means of a conical section eccentrically in an assigned groove in the other part.

SUMMARY OF THE INVENTION

The invention is based on the object of obtaining a play-free connection between the steering column and the steering wheel hub with less complexity.

In the case of a device for fastening a steering wheel hub on a steering column, a fastening screw which runs transversely to the steering column is guided in the hub and has a conical section for engagement in a channel or groove in the steering column. When the hub bears axially against a stop of the steering column, the axis of the screw is situated, according to the invention, higher than the channel or groove center of the steering column, and the hub bears in a positive-locking manner on the shaft above and below the channel or groove. In this case, the angle of taper of the conical section of the screw is smaller than 12° so as to obtain self-locking.

Because the axis of the screw is situated higher, on engagement of the conical part of the screw in the groove of the steering column, the hub is pressed against the stop. This eliminates the axial play. The hub is prevented from tilting about the axis of the screw by means of the positive-locking bearing of the hub against the steering column both above and below the channel or groove in the steering column.

It is expedient for the axis of the screw to be situated 0.5 mm higher than the groove center of the steering column.

In a first embodiment, a toothing is provided between the steering column and the hub above and below the channel or groove, the said toothing being used to produce the positive engagement between the steering column and hub. In this embodiment, the stop is planar or conical.

In a second embodiment, in the fastening region of the hub, the steering column is designed as a prism which is adjoined by a truncated pyramidal section which widens downwards to a larger cross section, the prism and the truncated pyramidal section having the same number of edges which are aligned with one another. The hub has a correspondingly designed receiving opening for producing the positive engagement between the steering column and hub, the truncated pyramidal section constituting the axial stop for the hub in this embodiment.

In a preferred refinement of the second embodiment, the prism and the truncated pyramidal section each have six edges. It is further expedient for the edges to be rounded.

The groove or channel is expediently designed in such a manner that the screw touches the steering column linearly after being locked in place.

It is furthermore expedient for a screw having a right-hand thread to be situated on the right-hand side of the axis of the steering column, as seen in the screwing-in direction of the screw. By this means, the hub is pressed onto the stop of the steering column.

The screw is expediently mounted in cylindrical bearings at both ends of the conical region. Compared to a bearing arrangement in the thread, manufacturing with the same tolerances is made more simple.

BRIEF DESCRIPTION OF THE DRAWINGS

The invention will be explained in an exemplary embodiment with reference to drawings, in which:

FIG. 1 shows a side view of a first embodiment of a steering column;

FIG. 2 shows a section through a hub part according to FIG. 3, as seen in the direction of the arrows II—II;

FIG. 3 shows a cross section through the hub part according to FIG. 2, as seen in the direction of the arrows III—III;

FIG. 4 shows a view of the screw for fastening the hub part on the steering column;

FIG. 5 shows the steering column according to FIG. 1 with the hub part placed on;

DETAILED DESCRIPTION OF THE INVENTION

Figure 5:
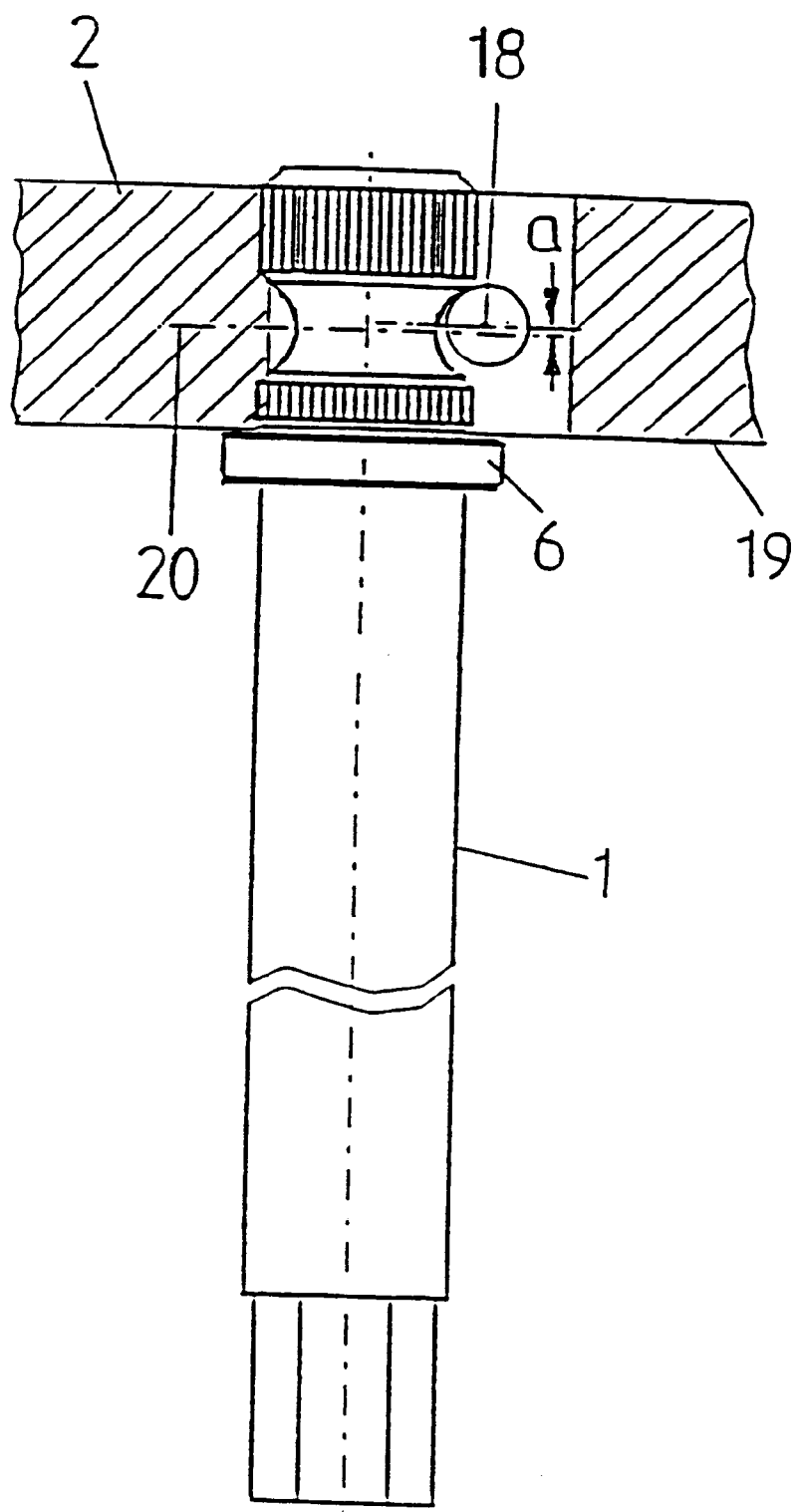

At its upper end, a steering column 1 has a socket for a hub part 2 of a steering wheel. The socket is provided with a serration 3 which is adjoined by a circumferential groove 4 below which a further serration 5 is provided. Below the last-mentioned serration, a stop 6 is arranged for the axial bearing of the hub part 2. The serrations 3 and 5 are assigned corresponding serrations (not illustrated) in a hole 7 in the hub part 2.

The hub part 2 has a socket which runs transversely to the hole 7 and is intended for a screw 8. This socket has a cylindrical bearing 9, a hollow conical section 10, a further cylindrical bearing 11 and a threaded section 12 which are assigned, in the sequence mentioned, sections 13, 14, 15 and 16 of the screw 8. The longitudinal axis 17 of the socket and therefore the longitudinal axis 18 of the screw 8 which is guided therein are situated in such a manner that after the hub part 2 is placed onto the steering column 1 and with the lower side 19 of the hub part 2 bearing against the stop 6, the axis 18 of the screw 8 is situated higher than the groove center 20 of the steering column 1 by an amount a (FIG. 5). This has the effect that the conical section 14 of the screw 8 when introduced into the groove 4 is initially pressed against the upper side thereof, and therefore the hub part 2 is pressed against the stop 6 on further screwing-in of the screw 8. This eliminates the axial play of the hub part on the steering column. In addition, the tilting of the hub part on the steering column is prevented by the serration 3, 5 present on both sides of the groove 4.

Figure 6:
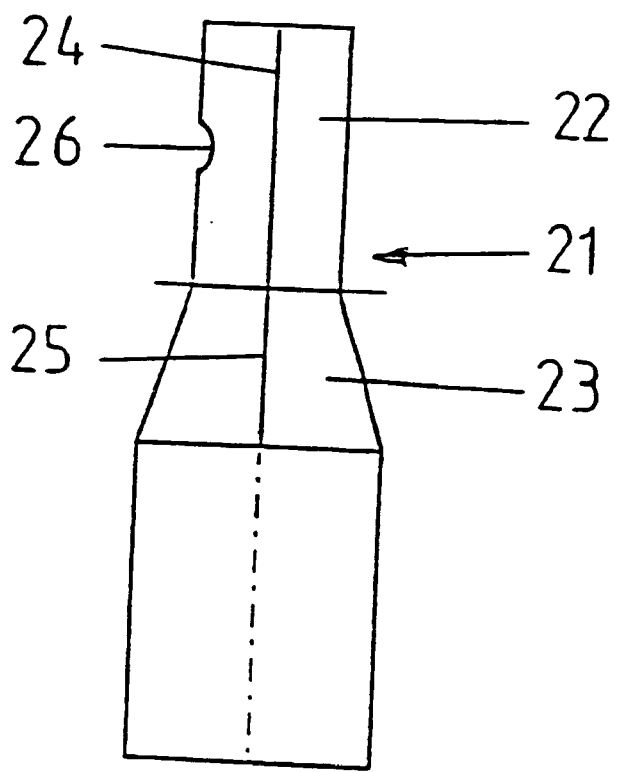
FIG. 6 shows a side view of a second embodiment of a steering column.
Figure 7:
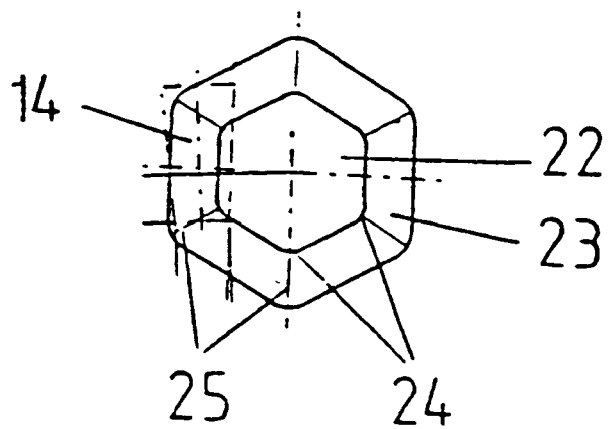
FIG. 7 shows a plan view of the steering column according to FIG. 6.

FIGS. 6 and 7 illustrate a steering column 21 which is designed in the upper region as a hexagonal prism 22 which is adjoined downwards by a hexagonal, truncated pyramidal section 23 which widens downwards to a larger steering-column shape. As can be seen in particular from FIG. 6, the edges 24 of the prism 22 and the edges 25 of the truncated pyramidal section 23 are aligned with one another.

The prism 22 has a groove 26 on one side for engagement of the screw 8. This groove is designed in such a manner that the screw and the steering column touch linearly. In FIG. 7, the engagement of the conical section 14 of the screw 8 in the groove 26 is indicated by dash-dotted lines.

The hub (not shown) for this second embodiment of the steering column has a receiving opening which is matched to the prism 22 and the adjoining, widening, truncated pyramidal section 23. This part of the receiving opening which is adapted to the last-mentioned section is of such a length that it at least partially covers this section of the shaft. In this embodiment, this truncated pyramidal section 23 constitutes the stop for the hub.

What is claimed is:

1. A device for fastening a steering wheel hub on a steering column, comprising:

a steering column with a stop and a channel with a center;

a steering wheel hub that bears axially against the stop of the steering column; and a fastening screw having an axis which runs transversely to the steering column guided in the steering wheel hub, the fastening screw having a conical section for engagement in the channel of the steering column, the conical section having an angle of taper of less than 12 degrees;

wherein the hub bears in a positive-locking manner against the steering column and below the channel;

wherein when the hub bears axially against the stop of the steering column, the axis of the screw is situated higher than the center of the channel of the steering column, and further comprising toothing between the steering column and the hub above and below the channel.

2. The device according to claim 1, wherein the axis of the screw is situated 0.5 mm higher than the center of the channel on the steering column.

3. The device according to claim 1, wherein the stop is one of planar and conical.

4. Device according to claim 1, wherein the fastening region of the hub the steering column is designed as a prism which is adjoined by a truncated pyramidal section which widens downwards to a larger cross section, the prism and the truncated pyramidal section having the same number of edges which are aligned with one another, and in that the hub has a correspondingly designed receiving opening.

5. The device according to claim 4, wherein the prism-shaped region and the truncated pyramidal section each have six edges.

6. The device according to claim 5, wherein the edges are rounded.

7. The device according to claim 1, wherein the channel has a shape such that the screw touches the steering column linearly after being locked in place.

8. The device according to claim 1, wherein the screw has a right-hand thread and lies on the right-hand side of the axis of the steering column as seen from the screwing-in direction of the screw.

9. The device according to claim 1, wherein the screw is mounted in cylindrical bearings at both ends of the conical section.

10. A steering wheel assembly, comprising:

a steering column with a stop and a channel with a center;

a steering wheel hub that bears axially against the stop of the steering column; and a fastening screw having an axis which runs transversely to the steering column guided in the steering wheel hub, the fastening screw having a conical section for engagement in the channel of the steering column, the conical section having an angle of taper of less than 12 degrees;

wherein the hub bears in a positive-locking manner against the steering column above and below the channel;

wherein when the hub bears axially against the stop of the steering column, the axis of the screw is situated higher than the center of the channel of the steering column.

11. The device according to claim 10, wherein the channel is formed in the external periphery of the steering column and the fastening screw extends tangentially with respect to the steering column.

12. The device for fastening a steering wheel hub on a steering column, comprising:

a steering column with a stop and a channel with a center;

a steering wheel hub that bears axially against the stop of the steering column; and a fastening screw having an axis which runs transversely to the steering column guided in the steering wheel hub, the fastening screw having a conical section for engagement in the channel of the steering column, the conical section having an angle of taper of less than 12 degrees;

wherein the hub bears in a positive-locking manner against the steering column and below the channel;

wherein when the hub bears axially against the stop of the steering column, the axis of the screw is situated higher than the center of the channel of the steering column, and wherein the channel is formed in the external periphery of the steering column and the fastening screw extends tangentially with respect to the steering column.

* * * * *